United States Patent
Chatterjee et al.

(10) Patent No.: US 10,628,043 B1
(45) Date of Patent: Apr. 21, 2020

(54) SYSTEMS AND METHODS FOR IMPLEMENTING A HORIZONTALLY FEDERATED HETEROGENEOUS CLUSTER

(71) Applicant: Amzetta Technologies, LLC, Norcross, GA (US)

(72) Inventors: Paresh Chatterjee, Fremont, CA (US); Srikumar Subramanian, Suwanee, GA (US); Loganathan Ranganathan, Cumming, GA (US); Raghavan Sowrirajan, Fremont, CA (US)

(73) Assignee: Amzetta Technologies, LLC, Norcross, GA (US)

( * ) Notice: Subject to any disclaimer, the term of this patent is extended or adjusted under 35 U.S.C. 154(b) by 0 days.

(21) Appl. No.: 15/969,056

(22) Filed: May 2, 2018

Related U.S. Application Data

(60) Provisional application No. 62/500,035, filed on May 2, 2017.

(51) Int. Cl.
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0665* (2013.01); *G06F 3/0689* (2013.01); *G06F 12/0238* (2013.01); *G06F 2212/1044* (2013.01); *G06F 2212/21* (2013.01)

(58) Field of Classification Search
CPC ...... G06F 3/064; G06F 3/0665; G06F 3/0689; G06F 12/0292
See application file for complete search history.

(56) References Cited

U.S. PATENT DOCUMENTS

| | | | |
|---|---|---|---|
| 7,536,529 | B1 | 5/2009 | Chatterjee et al. |
| 7,694,072 | B2 | 4/2010 | Nehse |
| 2013/0046892 | A1 | 2/2013 | Otani |
| 2016/0018992 | A1* | 1/2016 | Takamura ............ G06F 3/0604 711/165 |
| 2016/0132523 | A1* | 5/2016 | Traeger ............... G06F 16/1748 707/692 |
| 2019/0220454 | A1 | 7/2019 | Matsui et al. |

OTHER PUBLICATIONS

Co-pending U.S. Appl. No. 15/969,046, filed May 2, 2018 and its prosecution history.
Co-pending U.S. Appl. No. 15/969,079, filed May 2, 2018 and its prosecution history.

* cited by examiner

*Primary Examiner* — Than Nguyen
(74) *Attorney, Agent, or Firm* — Meunier Carlin & Curfman LLC

(57) ABSTRACT

Systems, methods, and computer-readable media for intelligent distribution of data in a storage cluster are described herein. An example method can include striping a volume across a plurality of storage nodes. For example, a plurality of logical blocks of the volume can be distributed to the storage nodes in relation to respective sizes of the storage nodes. Additionally, the method can include maintaining a cluster volume table (CVT) storing information regarding distribution of the logical blocks across the storage nodes. The CVT can include a plurality of entries, where each of the entries in the CVT can include information identifying a respective owner storage node of a respective logical block. Optionally, a factor can be used to determine a number of logical blocks distributed to a storage node for each stripe when striping the volume across the storage nodes.

21 Claims, 16 Drawing Sheets

SYSTEMS AND METHODS FOR IMPLEMENTING A HORIZONTALLY FEDERATED HETEROGENEOUS CLUSTER

CROSS-REFERENCE TO RELATED APPLICATIONS

This application claims the benefit of U.S. provisional patent application No. 62/500,035, filed on May 2, 2017, and entitled "SYSTEMS AND METHODS FOR IMPLEMENTING A HORIZONTALLY FEDERATED HETEROGENEOUS CLUSTER," the disclosure of which is expressly incorporated herein by reference in its entirety.

BACKGROUND

Scalability is a requirement in many data storage systems. Different types of storage systems provide diverse methods of seamless scalability through capacity expansion. In some storage systems, such as systems utilizing redundant array of inexpensive disk (RAID) controllers, it is often possible to add disk drives (or other types of mass storage devices) to a storage system while the system is in operation. In such a system, the RAID controller re-stripes existing data onto the new disk and makes the capacity of the other disks available for new input/output (I/O) operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field I/O operations independently, but are exposed to the initiator of the I/O operation as a single device, called a "storage cluster." Each storage server in a cluster is called a "storage node" or just a "node." When data storage capacity becomes low, a new server may be added as a new node in the data storage system. In addition to contributing increased storage capacity, the new storage node contributes other computing resources to the system, leading to true scalability. This methodology is known as "horizontal capacity expansion."

In a horizontally federated storage system with multiple storage nodes, a volume resides across various storage nodes. The volume is distributed such that each node owns a particular region of the volume. For example, data is striped across multiple storage nodes in conventional horizontally federated storage systems in much the same way as data is striped across disks in RAID arrays. The granularity of striping across storage nodes is at the territory level. Territory level striping, however, may not be able to provide network utilization scaling for sequential I/O operations, i.e., it may not be possible to ensure that different I/O operations are fielded by different nodes. This is because a group of sequential I/O operations may be served by a single node, which results in the other nodes remaining passive. While decreasing the granularity of striping (e.g., to chunk level) may ensure that the sequential burst of I/O operations is served by different nodes, chunk level striping would result in a greater and possibly unmanageable amount of metadata.

SUMMARY

The systems, methods, and computer-readable media described herein relate to the field of storage systems, and particularly to the field of storage servers. The systems, methods, and computer-readable media described herein provide a high-performance, efficient, network-scalable heterogeneous cluster device. The systems, methods, and computer-readable media described herein also provide for intelligent distribution of data among a plurality of storage nodes. The systems, methods, and computer-readable media described herein also provide for an intelligent initiator accessing multiple paths to a target in a highly efficient manner. The systems, methods, and computer-readable media described herein also provide for efficiently managing metadata tables such that the memory footprint and disk footprint are minimized as compared to those of conventional systems.

An example computer-implemented method for intelligent distribution of data in a storage cluster is described herein. The method can include striping a volume across a plurality of storage nodes. For example, a plurality of logical blocks of the volume can be distributed to the storage nodes in relation to respective sizes of the storage nodes. Additionally, the method can include maintaining a cluster volume table (CVT) storing information regarding distribution of the logical blocks across the storage nodes. The CVT can include a plurality of entries, where each of the entries in the CVT can include information identifying a respective owner storage node of a respective logical block. Optionally, a factor can be used to determine a number of logical blocks distributed to a storage node for each stripe when striping the volume across the storage nodes.

Alternatively or additionally, the CVT can optionally be stored in memory of a storage node. Optionally, the method can further include maintaining a system volume table (SVT) including a plurality of segments storing information mapping data to physical storage owned by the storage node. An entry in the CVT that includes information identifying the storage node as an owner of a logical block can further include a segment identifier of a segment of the SVT. Alternatively or additionally, the method can optionally further include creating a reverse SVT including a plurality of entries, where each of the entries in the reverse SVT can include information associating a respective segment of the SVT with a respective entry in the CVT. Alternatively or additionally, the method can optionally further include receiving an I/O operation at the storage node, determining, using the CVT, whether the I/O operation is directed to a logical block owned by the storage node, and if the I/O operation is directed to the logical block owned by the storage node, accessing, using the SVT, a location in the physical storage owned by the storage node.

Alternatively or additionally, the method can further include generating the CVT in memory using an on-disk CVT, a CVT disk map, and the reverse SVT. For example, the CVT stored in memory can be generated during a power-on operation or system startup. Optionally, the CVT stored in memory (e.g., 4 GB) can have a larger footprint than the on-disk CVT (e.g., 1 GB).

Alternatively or additionally, the CVT can optionally be stored in a disk. Optionally, the CVT can be stored in a contiguous portion of the disk that stores respective CVTs for a plurality of volumes. In some implementations, the CVT can include a plurality of fragmented segments in the contiguous portion of the disk. In other implementations, the CVT can include a continuous segment in the contiguous portion of the disk. Alternatively or additionally, the method can optionally further include maintaining a CVT disk map including a plurality of entries, where each of the entries in the CVT disk map can include a global offset field, a length field, and a next segment field.

Another example computer-implemented method for intelligent distribution of data in a storage cluster is described herein. The method can include striping a volume across a plurality of storage nodes. For example, a plurality of logical blocks of the volume can be distributed to the storage nodes. Optionally, a factor can be used to determine a number of logical blocks distributed to a storage node for each stripe when striping the volume across the storage nodes. Additionally, the method can include maintaining a CVT storing information regarding distribution of the logical blocks across the storage nodes. The CVT can include a plurality of entries, where each of the entries in the CVT can include information identifying a respective owner storage node of a respective logical block. The method can further include maintaining an SVT including a plurality of segments storing information mapping data to physical storage owned by a storage node, and creating a reverse SVT including a plurality of entries, where each of the entries in the reverse SVT can include information associating a respective segment of the SVT with a respective entry in the CVT.

Optionally, the CVT, the SVT, and the reverse SVT can be stored in a disk. Additionally, the CVT can optionally be stored in a contiguous portion of the disk that stores respective CVTs for a plurality of volumes. Additionally, the information associating the respective segment of the SVT with the respective entry in the CVT can include an address of the respective entry in the CVT within the contiguous portion of the disk.

Additionally, the method can optionally further include creating a CVT header including a plurality of entries, where each of the entries in the CVT header can include a volume field, a volume offset field, a global offset field, and a length field. Additionally, the method can optionally further include generating an in-memory CVT using the CVT, the CVT header, and the reverse SVT stored in the disk. For example, the in-memory CVT can be generated during a power-on operation or system startup. Alternatively or additionally, an entry in the in-memory CVT that includes information identifying the storage node as an owner of a logical block can include a segment identifier of a segment of the SVT. Optionally, the in-memory CVT (e.g., 4 GB) can have a larger footprint than the on-disk CVT (e.g., 1 GB).

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for intelligent distribution of data in a storage cluster, it will become evident to those skilled in the art that the implementations are not limited thereto.

Figure 1:
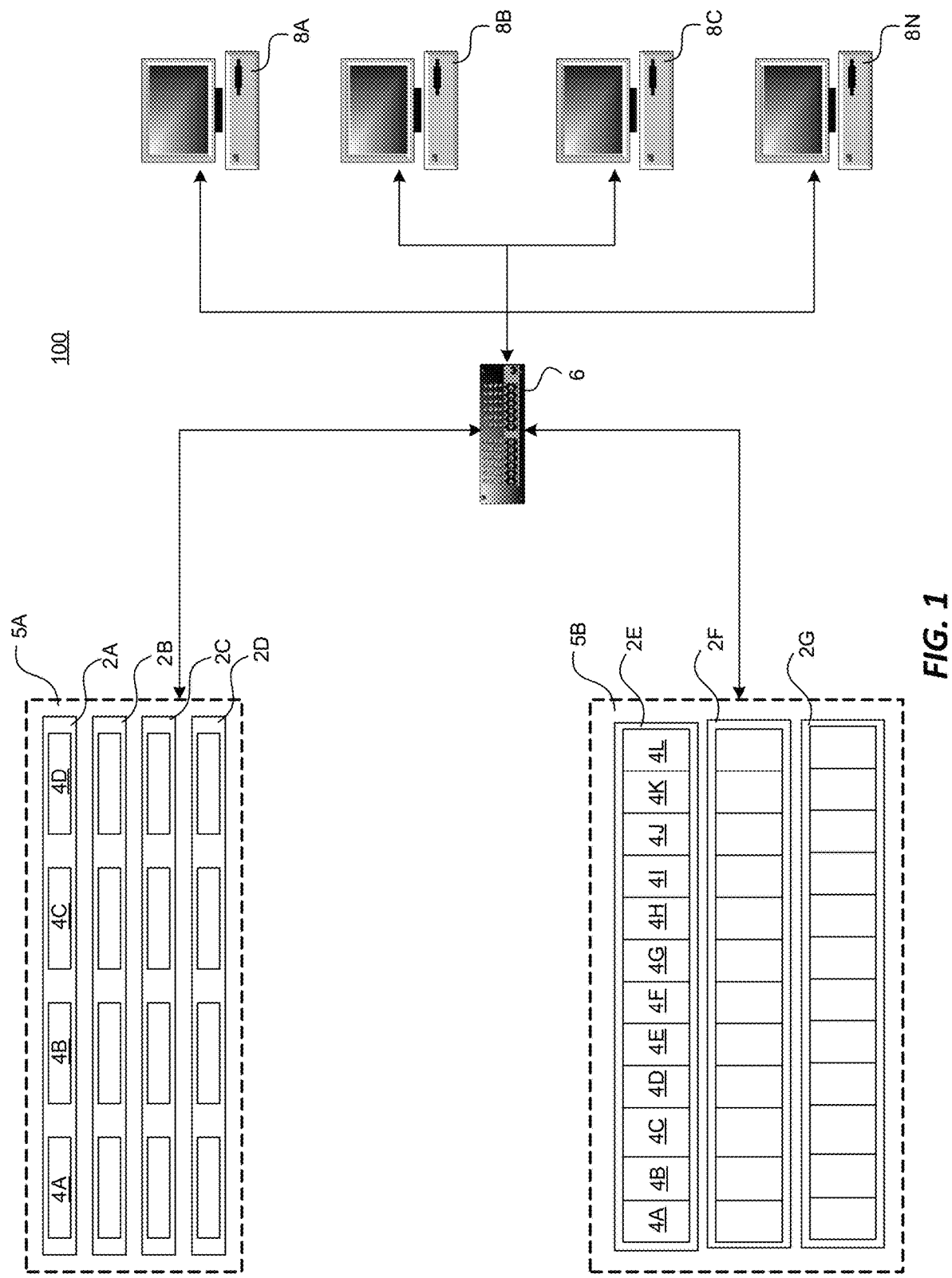
FIG. 1 is a computer architecture and network diagram showing aspects of a computer network and a storage server computer that provides an operating environment for embodiments of the disclosure presented herein.
Figure 2:
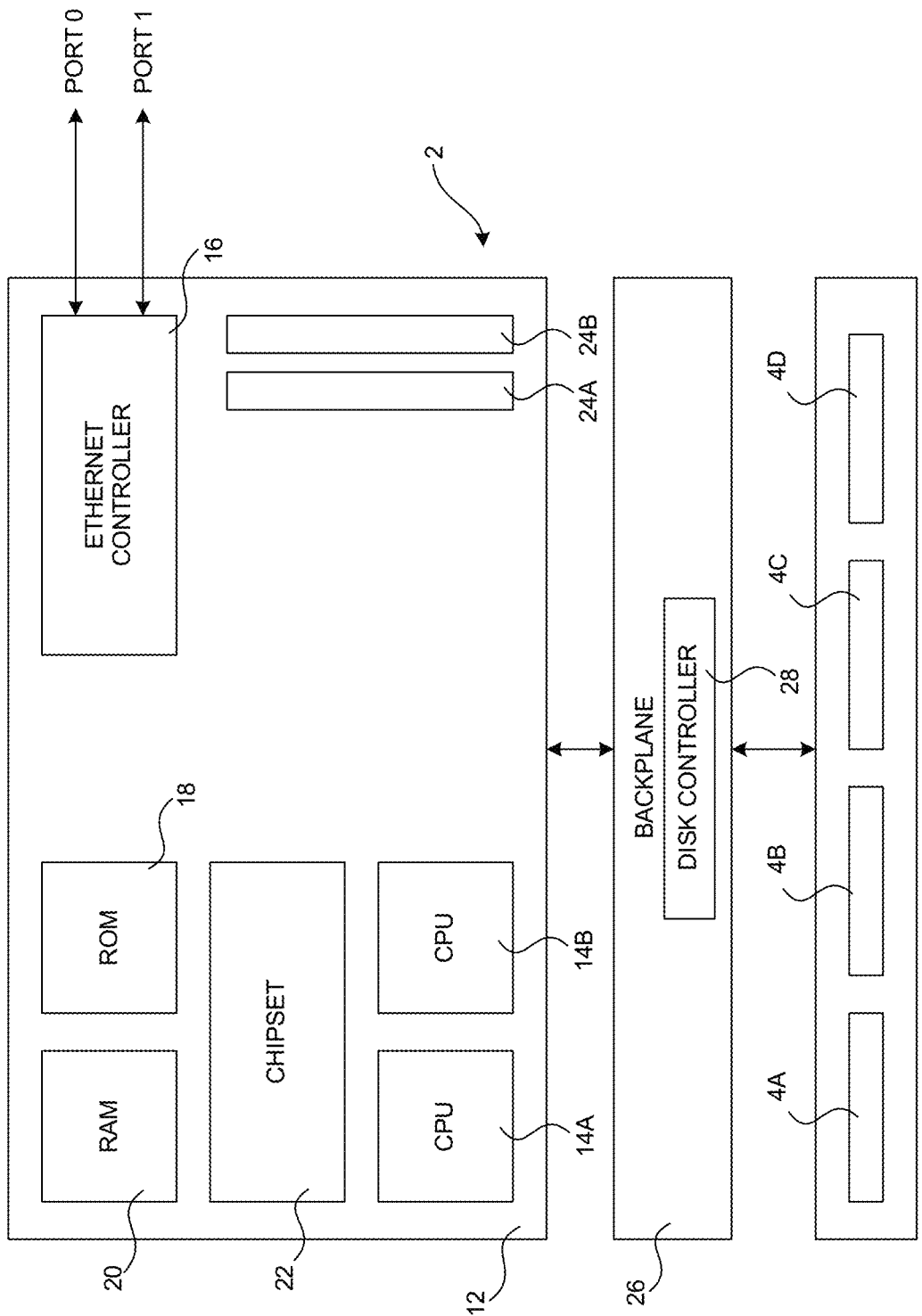
FIG. 2 is a computer architecture diagram illustrating aspects of the hardware of an illustrative storage server computer described herein.

FIGS. 1 and 2 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for intelligent distribution of data in a storage cluster. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node" or "storage system computer", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

As described below, data may be striped across a plurality of storage nodes. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing multiple nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators", collectively initiators 8). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units (CPUs) 14A-14B, a network adapter, such as the Ethernet controller 16, a system memory, including a Read Only Memory 18 (ROM) and a Random Access Memory 20 (RAM), and other hardware for performing input and output, such as a video display adapter or a universal serial bus port (USB), not all of which are illustrated in FIG. 2. In some implementations, a storage server computer can include dual storage controllers (e.g., left canister (LC) and right canister (RC)), with each of the LC and RC being considered a storage node.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system (BIOS) or Extensible Firmware Interface (EFI) compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment (SATA) interface, a small computer system interface (SCSI), a fiber channel (FC) interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

As noted above, in some implementations, a storage server computer can include dual storage controllers (e.g., left canister (LC) and right canister (RC)), with each of the LC and RC being considered a storage node. Each individual storage controller (e.g., LC and RC) can include a motherboard (e.g., motherboard 12 of FIG. 2) including CPU, chipset, RAM, ROM, Ethernet controller, and/or hardware slots as described above. Each storage controller can be connected to the hard disk drives 4A-4D through a common backplane (e.g., backplane 26 of FIG. 2). Optionally, each storage controller can include a disk controller (e.g., disk controller 28 of FIG. 2) for communicating with the hard disk drives 4A-4D. In this case, a disk controller can be provided on the motherboard of each storage controller. In one embodiment, the physical and electrical structure of the common backplane may be based upon the storage bridge bay ("SBB") specification. The SBB specification defines mechanical, electrical, and low-level enclosure management requirements for a single enclosure that supports the connection of multiple storage controllers as well as multiple physical disks (e.g., hard disk drives 4A-4D) from a variety of hardware and system vendors. The SBB mid-plane provides the common backplane that allows multiple storage controllers to be connected to and communicate with the physical disks concurrently.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

As described above, horizontal federation results in data being spread across a plurality of storage nodes, i.e., a volume exists across multiple storage nodes. Additionally, vertical federation results in data being spread across a plurality of disks such as a Redundant Array of Inexpensive Disks (RAID). In a data storage system implementing both horizontal federation and vertical federation, a volume can be spread across multiple RAID arrays and also across multiple storage nodes. A distributed volume management (DVM) for horizontal and vertical federation can have two parts. The first part provides a global view of the volume, i.e., it can store data placement information pertaining to all of the storage nodes. A first table—a cluster volume table (CVT) as described herein—can provide the global view of the volume. The second part provides a local data residency view of volume data owned by a particular storage node, i.e., it can store data placement information pertaining to a particular storage node. A second table—a system volume table (SVT) as described herein—can provide the local data residency view of volume data. In other words, the DVM module for horizontal and vertical federation can maintain at least two separate tables, i.e., the CVT and the SVT as described herein.

Figure 3:
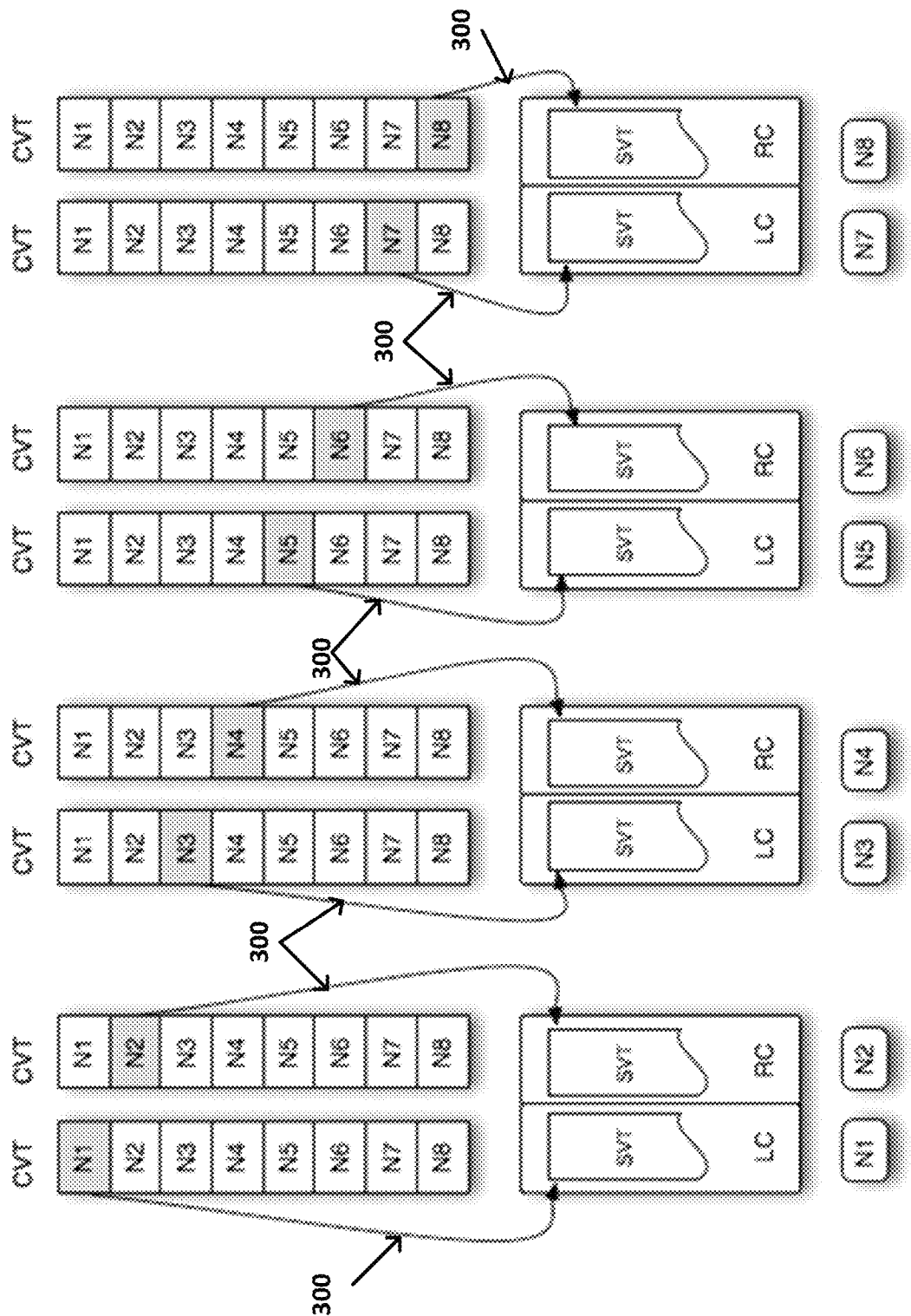
FIG. 3 is a diagram illustrating a volume distributed at 8 MB granularity across a plurality of storage nodes (e.g., storage nodes N1-N8).

Referring now to FIG. 3, a volume distributed at 8 MB granularity across a plurality of storage nodes (e.g., Nodes N1-N8) is shown. A CVT can be maintained for storing information about data distribution of the volume across the storage nodes. For a volume with size Vg residing across multiple storage nodes (e.g., Nodes N1-N8), each storage node maintains a CVT, which includes a plurality of entries representing the entire volume size Vg. In other words, each one of Nodes N1-N8 maintains its own CVT as shown in FIG. 3. It should be understood that the CVT maintained by each of Nodes N1-N8 is the same, i.e., it provides the same global view of the volume. The CVT can be an array of bits that contains information concerning the distribution of the volume across the storage nodes. The CVT can include a plurality of entries, where each of the entries in the CVT can include information identifying a respective owner storage node for a respective logical block (e.g., a territory) of the volume. For example, each of the entries can store 8 bits to identify the respective owner storage node number for a respective logical block of the volume. It should be understood that the size of the information identifying an owner storage node (e.g., 8 bits) is provided only as an example and that this information can be more or less than 8 bits.

Each storage node, however, accounts for (i.e., owns) only a part of the entire volume. As described in further detail below, each of the storage nodes (e.g., Nodes N1-N8) also maintains an SVT for mapping data to physical storage owned by the particular storage node. In other words, each one of Nodes N1-N8 maintains its own SVT as shown in FIG. 3. Unlike the CVTs, the SVTs maintained by Nodes N1-N8 are unique to each particular storage node, i.e., each provides the local data residency view of the portion of the volume data owned by the particular storage node. As shown in FIG. 3, entries in a CVT corresponding to locally owned logical blocks can have a pointer 300 to the storage node's SVT. It should also be understood that the CVT is the metadata table storing information about the distribution of the volume across the storage nodes. Further, this disclosure contemplates that the CVT can be stored by a storage node (e.g., storage server computer 2 of FIG. 2). In some implementations, a storage server computer can include dual storage controllers (e.g., left canister (LC) and right canister (RC)), with each of the LC and RC being considered a storage node.

Optionally, the granularity of the CVT can be logical-block-level granularity such as a territory (8 MB), i.e., territory-level granularity. Thus, each entry of the CVT can store information identifying the owner storage node number (e.g., an 8-bit array) accounting for that volume territory. It should be understood that 8 MB territory-level granularity is provided only as an example and that a territory can be more or less than 8 MB. For example, the CVT can be an array including a plurality of entries storing information identifying Node N1 as the owner storage node of territory 1 (i.e., 0-8 MB), Node N2 as the owner storage node of territory 2 (i.e., 8-16 MB), Node N3 as the owner storage node of territory 3 (i.e., 16-24 MB), Node N4 as the owner storage node of territory 4 (i.e., 24-32 MB), Node N5 as the owner storage node of territory 5 (i.e., 32-40 MB), Node N6 as the owner storage node of territory 6 (i.e., 40-48 MB), Node N7 as the owner storage node of territory 7 (i.e., 48-56 MB), and Node N8 as the owner storage node of territory 8 (i.e., 56-64 MB), etc. It should be understood that the number of storage nodes (e.g., 8 storage nodes) and/or the granularity of data distribution (e.g., 8 MB) can be more or less than those shown in FIG. 3, which is provided as an example only.

As noted above, in some implementations, a storage server computer can include dual storage controllers (e.g., left canister (LC) and right canister (RC)), with each of the LC and RC being considered a storage node. In this implementation, it should be understood that one of the storage controllers may fail. For example, in the event of failure of a LC, both Node N1 and Node N2 can reside in RC temporarily until LC is operational. In this scenario, there is no change to the CVT, but Node N2 can maintain two SVTs, i.e., one SVT belonging to the storage pool owned by Node N1 and one SVT belonging to the storage pool owned by Node N2. It should be understood that this scenario is provided only as an example, and that controller failure may occur for other nodes.

Figure 4:
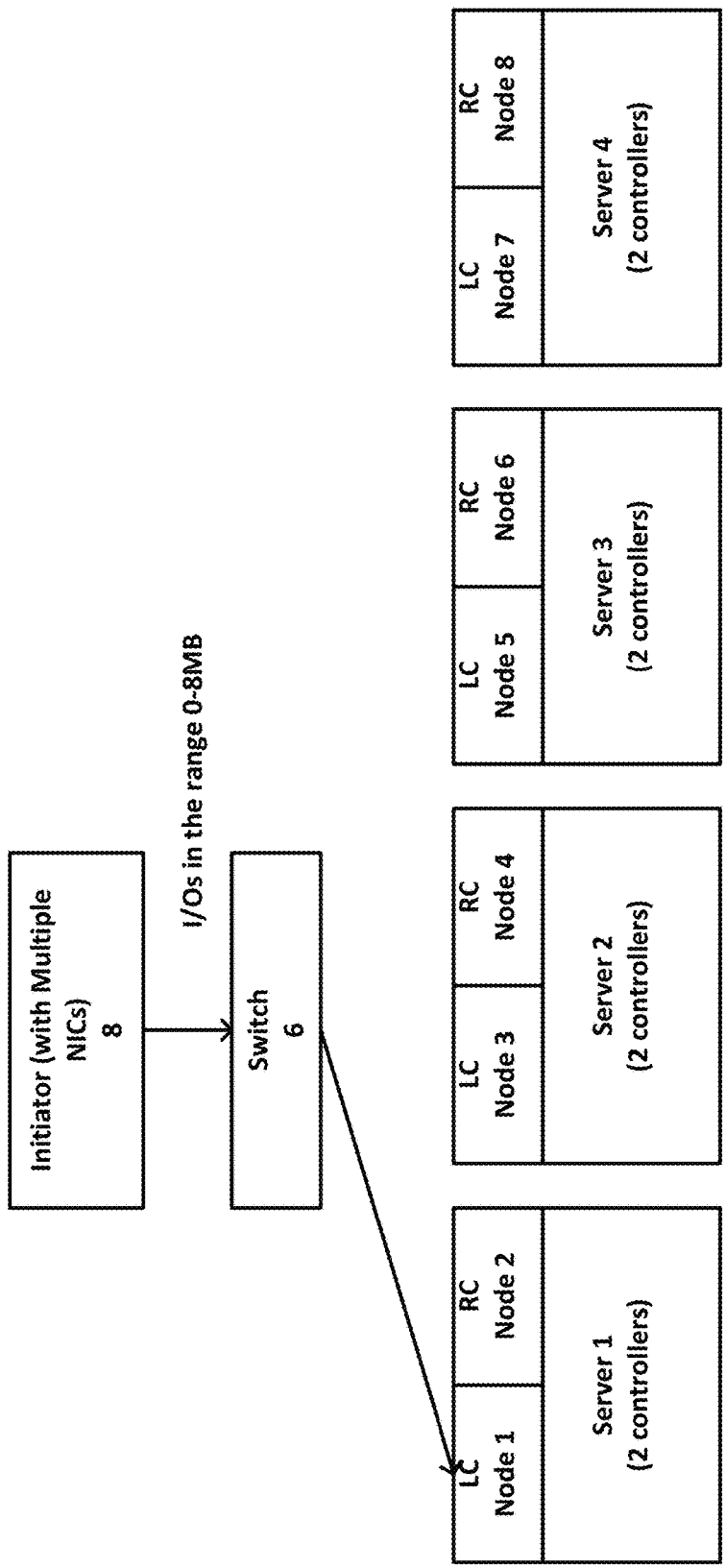
FIG. 4 is a block diagram illustrating a computing environment where I/O operations are owned at territory-level (e.g., 8 MB).

Referring now to FIG. 4, a block diagram illustrating a computing environment where I/O operations are owned at territory-level (e.g., 8 MB) is shown. The computing environment includes initiators 8, network switch 6, and a plurality of storage nodes (e.g., Nodes N1-N8). As described with regard to FIG. 1, the initiators 8 can be operably connected to the storage nodes Nodes N1-N8 via the network switch 6. Additionally, a storage node can be a storage server computer as described with regard to FIG. 2. Alternatively or additionally, a storage server computer can include dual storage controllers (e.g., left canister (LC) and right canister (RC)), with each of the LC and RC being considered a storage node. Referring again to FIG. 4, the data is distributed at territory-level granularity (e.g., 8 MB) as shown in FIG. 3. Thus, when an I/O operation is directed to the region 0-8 MB (e.g., territory 1) as shown in FIG. 4, for example, it is served by Node N1 if it lands on Node N1 or redirected to Node N1 for service if it lands on Nodes N2-N6. The owner storage node associated with the region 0-8 MB (e.g., Node N1 in the example shown in FIG. 4) can be identified by referencing the CVT. It should be understood that a sequential burst of I/O operations directed to the region 0-8 MB (e.g., territory 1) would be served by Node N1 in the example shown in FIG. 4.

Figure 5:
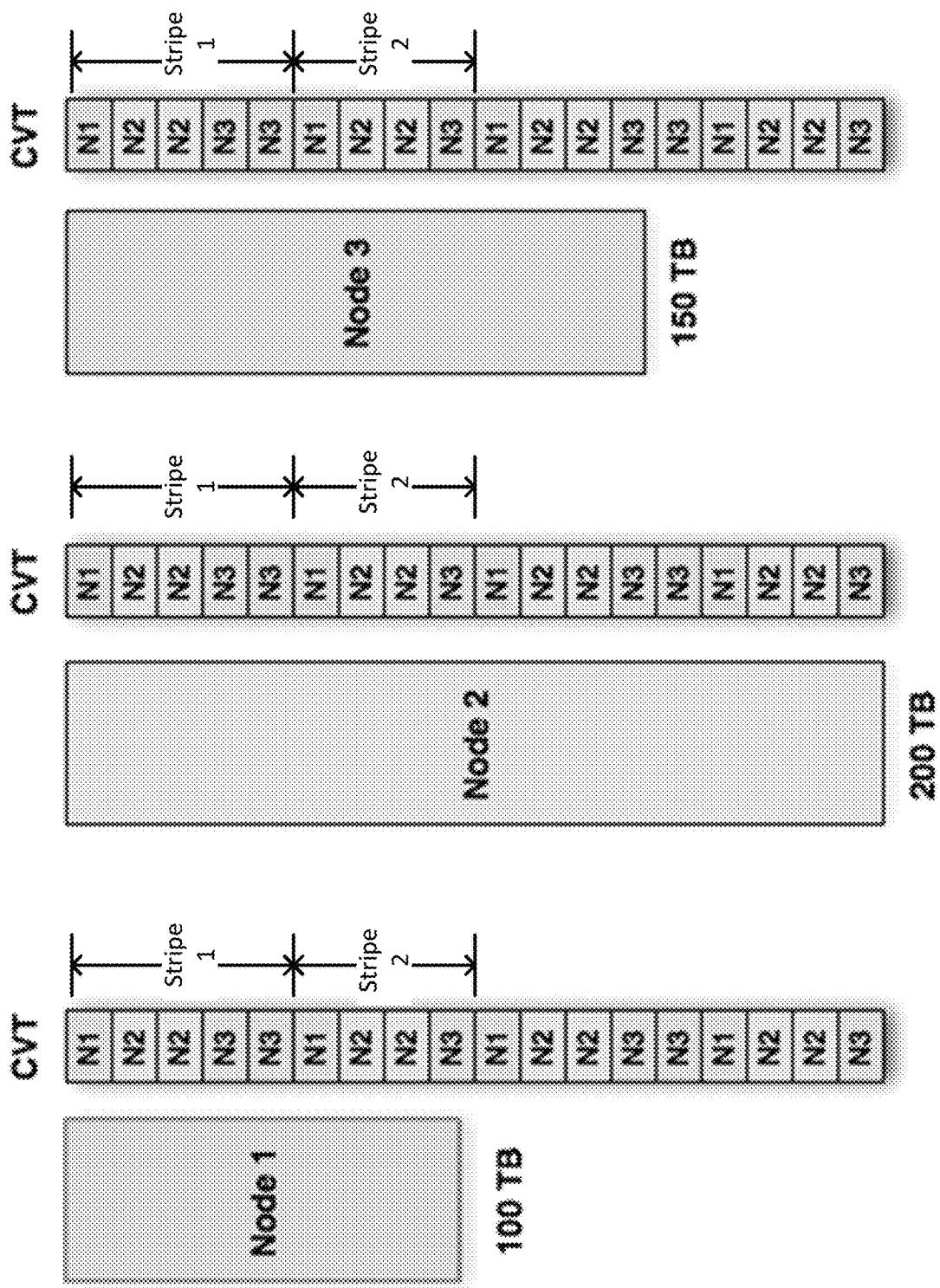
FIG. 5 is a diagram illustrating example logical block distribution across a plurality of storage nodes.

Referring now to FIG. 5, example logical block distribution across a plurality of storage nodes for a volume is shown. A CVT can be created during creation of a volume, which can be striped across a plurality of storage nodes (e.g., Nodes 1-3). For example, a plurality of logical blocks of the volume can be distributed to Nodes 1-3 in relation to respective sizes of the storage nodes. In FIG. 5, Node 1 is 100 TB, Node 2 is 200 TB, and Node 3 is 150 TB. It should be understood that the number and/or respective sizes of storage nodes in FIG. 5 are provided only as examples and can other values. Optionally, a factor can be used to determine a number of logical blocks distributed to a storage node for each stripe when striping the volume across Nodes 1-3. This facilitates including asymmetrical storage nodes in the storage cluster. The individual storage nodes can be of variable sizes, and in such a case, the striping has a factor that determines the number of logical blocks to be distributed to each storage node every stripe. As shown in FIG. 5, the factors for each of Nodes 1-3 are 1×, 2×, and 1.5×, respectively. Accordingly, for each stripe, Node 1 receives one (1) logical block and Node 2 receives two (2) logical blocks. Node 3 receives one (1) logical block and two (2) logical blocks alternately such that its factor of 1.5× is distributed across two stripes.

Figure 6B:
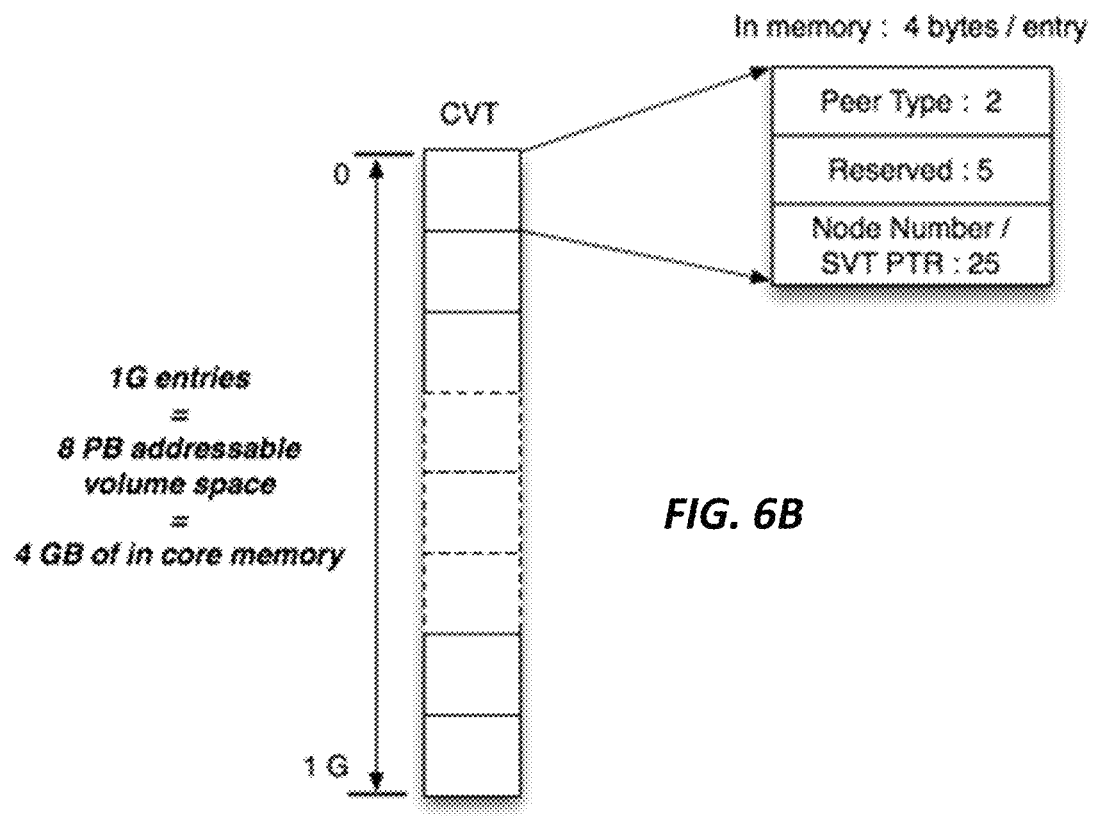
FIG. 6B is a diagram illustrating the CVT stored in memory of a particular storage node.
Figure 6A:
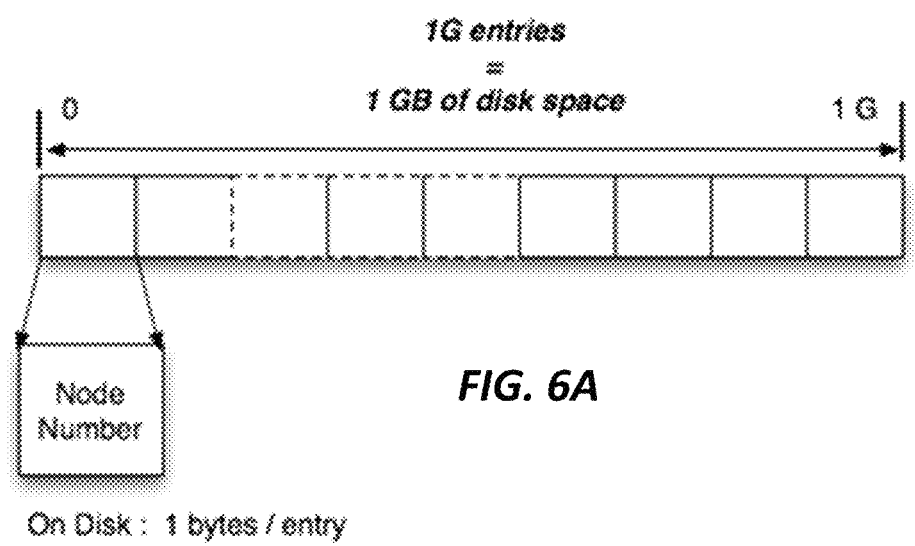
FIG. 6A is a diagram illustrating the CVT stored in a disk.

Referring now to FIGS. 6A and 6B, an entry in the CVT stored in memory of a storage node (e.g., storage node 2 of FIG. 2) and stored in a disk, respectively, are shown. As discussed above, the CVT can include a plurality of entries as shown in FIGS. 6A and 6B, where each of the entries can include information identifying a respective owner storage node for a respective logical block (e.g., a territory) of the volume. For example, each entry in the CVT can include the Node Number of a respective owner storage node for a respective logical block of the volume. The CVT provides the global view of data placement across all of the storage nodes. In FIGS. 6A and 6B, the CVT includes 1G entries ($1 \times 10^9$ entries). For 8 MB logical block level granularity, it should be understood that a CVT including 1G entries corresponds to 8 PB of addressable volume space $$\left(i.e., \frac{8\text{ MB addressable space}}{\text{entry}} \times 1G \text{ entries} = 8PB\right).$$

It should be understood that the number of entries in the CVT, the size of the entries in the CVT, and/or the logical block granularity level are provided only as examples and can have other values.

FIG. 6A illustrates the CVT stored in a disk (sometimes referred to herein as "on-disk CVT"), where the entries include only the Node Number of a respective owner storage node for a respective logical block of the volume. The CVT can be flushed or persisted to a disk in response to storage node shutdown. In some implementations, the Node Number can be an 8-bit array. Thus, 1 GB of disk space is needed to store 1G entries $$\left(i.e., \frac{1\text{ byte}}{\text{entry}} \times 1G \text{ entries} = 1\text{ GB}\right).$$

FIG. 6B illustrates the CVT as stored in memory of a particular storage node (sometimes referred to herein as "in-memory CVT"), which includes both the Node Number and the local data residency information for the particular storage node (e.g., the SVT pointer). The CVT can be maintained in memory during operation of the storage node. As shown in FIG. 6B, each entry in the CVT stored in memory can be 4 bytes, including a Peer Type field (2 bits), a Reserved field (5 bits), and a Node Number/SVT Pointer field (25 bits). Thus, 4 GB of memory is needed to store 1G entries ($1 \times 10^9$ entries)

$$\left(i.e., \frac{4\text{ byte}}{\text{entry}} \times 1G \text{ entries} = 4\text{ GB}\right).$$

The Peer Type field can indicate whether the entry in the CVT is associated with a locally-owned (e.g., set to 00) logical block or remotely-owned (e.g., set to 01) logical block. If the entry in the CVT is associated with a locally-owned logical block, then the Node Number/SVT Pointer field includes a segment identifier of a segment of the SVT, which is described in further detail below. On the other hand, if the entry in the CVT is associated with a remotely-owned logical block, then the Node Number/SVT Pointer field includes only the Node Number. The CVT stored in memory contains local data residency information pertaining to the particular storage node. Thus, entries in the in-memory CVT are place holders each with the size of a segment identifier (e.g., 25 bits in length). As shown in FIGS. 6A and 6B, the CVT's disk footprint is less than its memory footprint (e.g., 1 GB v. 4 GB) since the entries in the CVT stored in the disk include only the Node Number. This disclosure contemplates that minimizing the footprint of the CVT stored on disk requires less storage space, which can reduce the cost of a storage system. It should be understood that storage space has a cost per gigabyte (GB). Therefore, solutions requiring less metadata can be less expensive.

Figure 7:
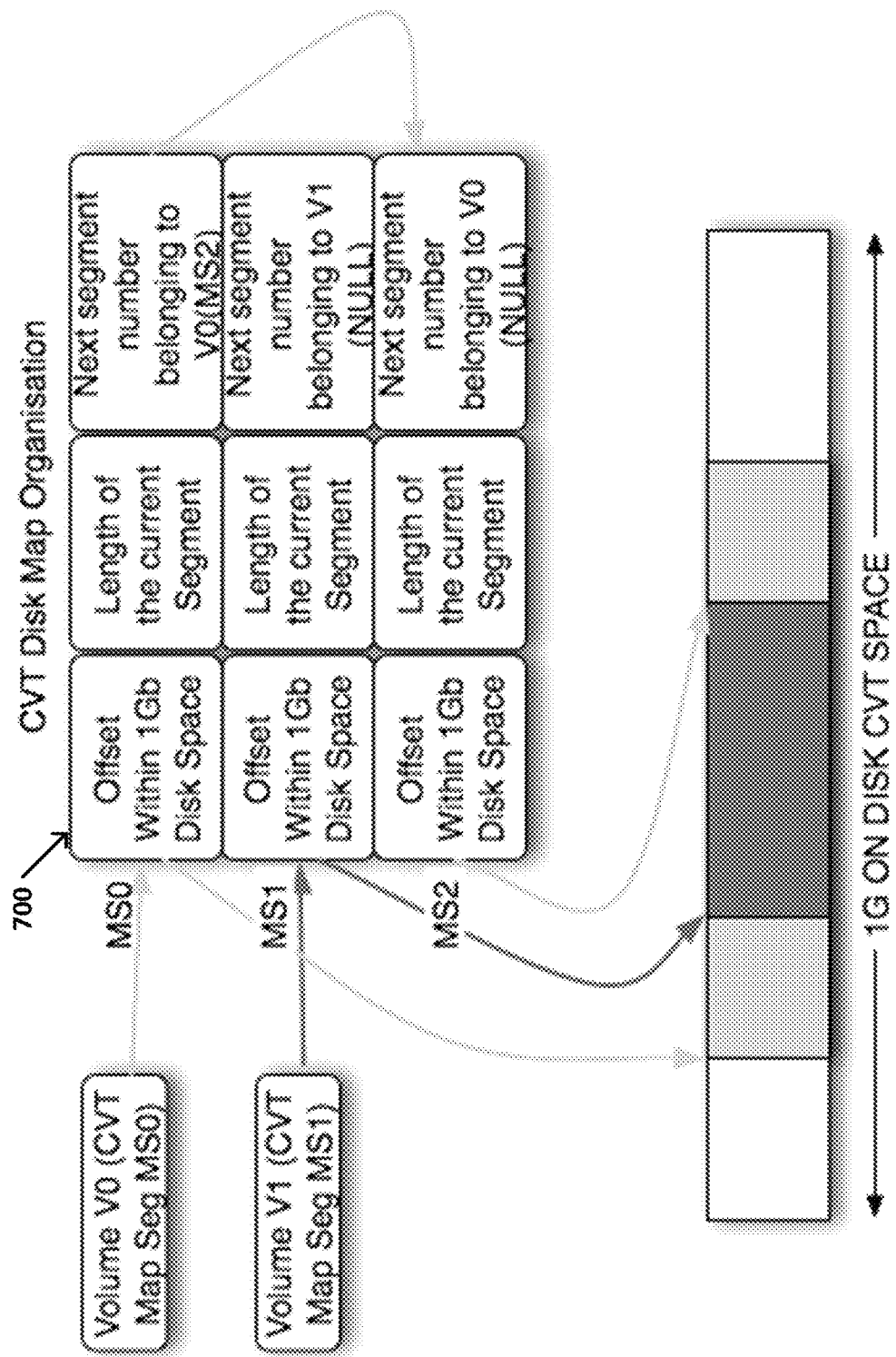
FIG. 7 is a diagram illustrating CVT disk storage and CVT disk map organization.

Referring to FIG. 7, CVT disk storage and CVT disk map organization are shown. As described above with regard to FIGS. 6A and 6B, the CVT with 1G entries can have a 1 GB footprint on the disk. This disclosure contemplates that a CVT is created during creation of a volume. Accordingly, for each volume creation, the respective CVT is flushed to the disk. The 1 GB footprint for storing CVTs can be a common placeholder for a plurality of volumes of the storage cluster. In other words, the respective CVTs for the plurality of volumes collectively cannot exceed the 1 GB of disk space. Optionally, a contiguous portion of the disk (e.g., 1 GB) can be reserved for storing the respective CVTs for all of the volumes. This is sometime referred to herein as the "global CVT address space." Because individual volumes can be expanded, deleted, and/or recreated, etc. with different sizes, the respective CVT for each volume might not have a continuous footprint on the disk. For example, in some cases, a CVT can include a plurality of fragmented segments (e.g., the CVT for Volume VO in FIG. 7) in the contiguous portion of the disk. In other cases, the CVT can include a continuous segment (e.g., the CVT for Volume V1 in FIG. 7) in the contiguous portion of the disk.

As shown in FIG. 7, a CVT disk map 700 including a plurality of entries (e.g., CVT Map Seg MS0, CVT Map Seg MS1, CVT Map Seg MS1) can be maintained. The CVT disk map 700 can be used to manage the on-disk location information of the respective CVTs for each of the volumes within the global CVT address space. Each of the entries in the CVT disk map 700 can include a global offset field (e.g., the offset within the global CVT address space), a length field (e.g., a length of the segment), and a next segment field (e.g., a pointer to the next CVT Map Seg in the volume). Each of the entries in the CVT disk map 700 can be 12 bytes, which is provided only as an example. This disclosure contemplates that each of the entries can be more or less than 12 bytes. Optionally, it is possible to set a minimum allocation size for a CVT. For example, a minimum allocation size can optionally be set to 8 KB. In other words, when a space is reserved among the 1 GB contiguous portion of the disk (e.g., within the global CVT address space), it will be reserved in terms of 8 KB segments. With a minimum allocation size of 8 KB, the 1 GB CVT footprint can include 128 k ($128 \times 10^3$) segments. With 128 k entries, the CVT disk map 700 has a footprint of about 1.5 megabytes (MB) (e.g., 12 bytes×128 k entries). For 8 MB logical block level granularity, it should be understood that an 8 KB segment of CVT space can address 64 GB volume size $$\left(i.e., \frac{8 \text{ MB addressable space}}{\text{entry}} \times \frac{8k \text{ CVT entries}}{\text{segment}} = 64 \text{ GB volume per segment}\right).$$

For volumes less than or not a multiple of 64 GB, there will be CVT space wastage, resulting in inability to create volumes totaling 8 PB. However, since 64 GB is a relatively small size as compared to 8 PB, it should be understood that wastage and resulting losses would be minimal using the minimum allocation size of 8 KB. It should be understood that the minimum allocation size of 8 KB is provided only as an example and can have another value.

The entries in the CVT disk map 700 can be used to manage the on-disk location of the CVTs for the volumes (e.g., Volumes V0 and V1). For example, a volume (e.g., Volume V0 or Volume V1 in FIG. 7) can have a pointer to one of the 128 k segments in the 1 GB CVT footprint. The volume pointer indicates as to where the start of the volume's CVT is present in the disk (e.g., using the global offset field). From then on, the CVT disk map entries lead to the next segment used by the volume (e.g., using the length field and next segment field). For example, in some cases, a CVT can include a plurality of fragmented segments (e.g., the CVT for Volume V0 in FIG. 7) in the contiguous portion of the disk. Entry CVT Mag Seg MS0 in the CVT disk map 700 is the first fragmented segment for Volume V0, and its next segment field includes a pointer to CVT Mag Seg MS2. Entry CVT Mag Seg MS2 in the CVT disk map 700 is the second fragmented segment for Volume V0. The next segment field of entry CVT Mag Seg MS2 includes a NULL pointer, which indicates that it is the last fragmented segment. In other cases, the CVT can include a continuous segment (e.g., the CVT for Volume V1 in FIG. 7) in the contiguous portion of the disk. Entry CVT Mag Seg MS1 in the CVT disk map 700 is the continuous segment for Volume V1, and its next segment field includes a NULL pointer, which indicates that it is the only segment. This disclosure contemplates that, for continuous CVT reservations in disk, the number of segments used would be far lesser than 128K. All of the 128K segments would be used only if the CVT reservations were such that not even two continuous segments could be reserved. That is the length of all segments was 1.

Figure 8A:
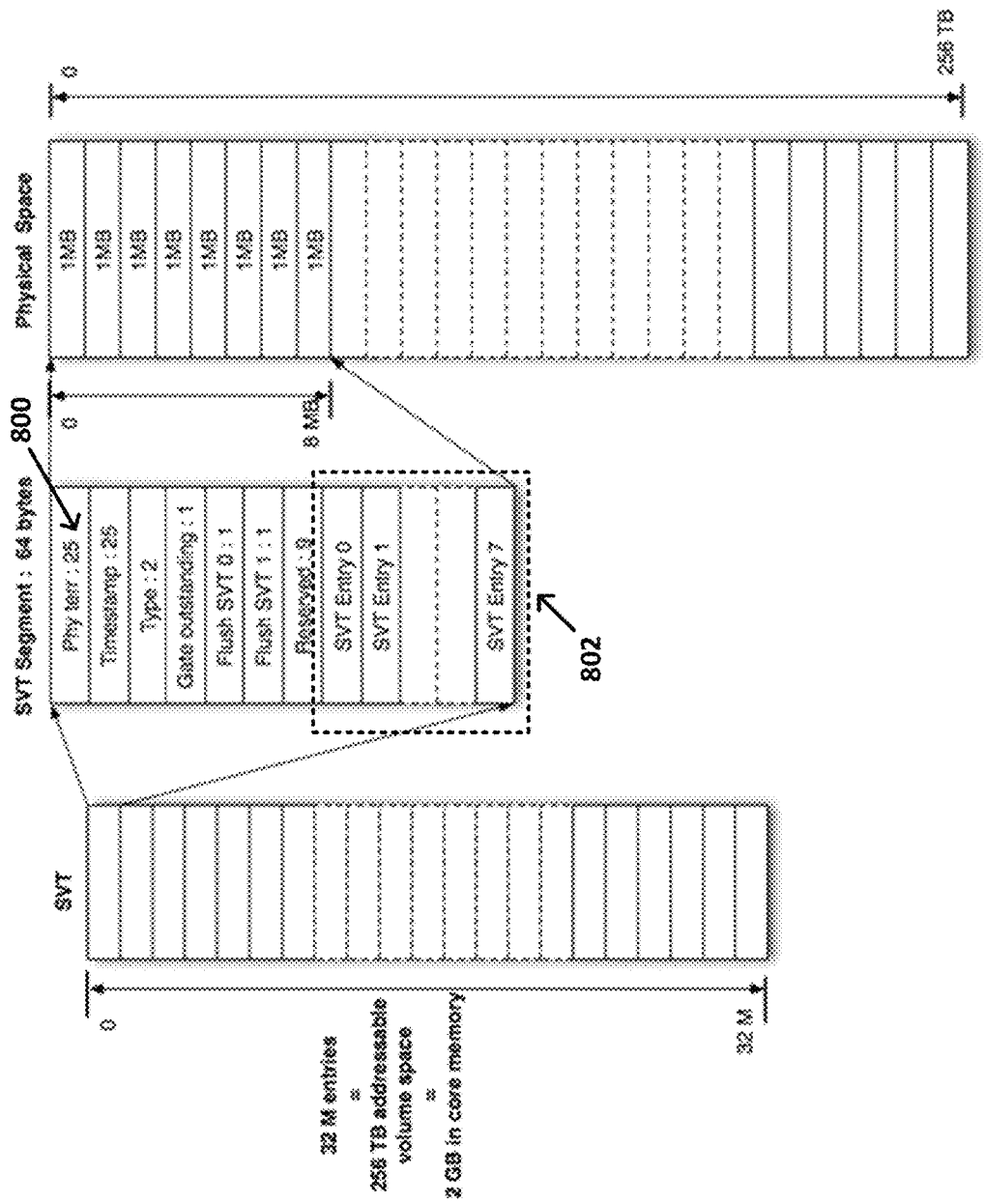
FIG. 8A is a diagram illustrating an example SVT.
Figure 8B:
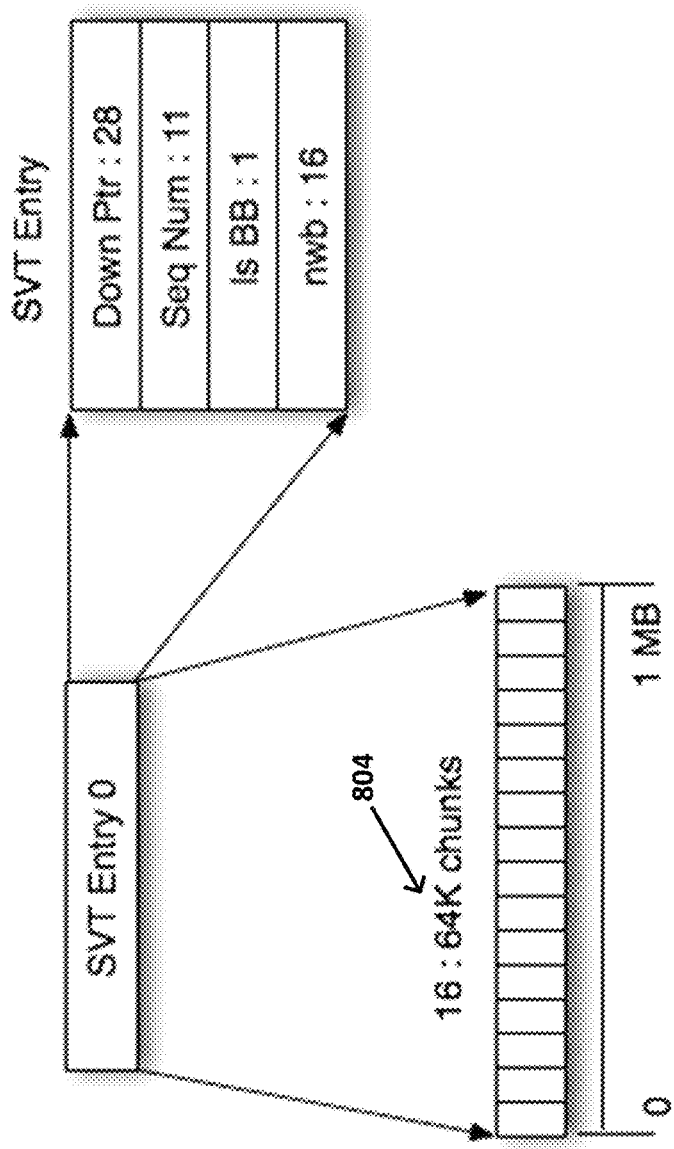
FIG. 8B is a diagram illustrating an example entry in the SVT.

Referring to FIG. 8A, an example SVT is shown. The SVT can be used to manage each storage node's physical storage, which can be spread across multiple RAID arrays. The SVT also provides snapshot capabilities. Volume tables are known in the art, for example, as described in U.S. Pat. No. 7,536,529, issued May 19, 2009 to Chatterjee et al., entitled "Method, System, Apparatus, and Computer-Readable Medium for Provisioning Space in a Data Storage System." The SVT can include a plurality of segments storing information mapping data to physical storage owned by the storage node. For 8 MB logical block level granularity, each segment can be used to account for 8 MB of physical storage. As shown in FIG. 8A, a segment in the SVT can be 64 bytes, including a segment identifier 800 (e.g., Phy terr: 25 bits). The segment in the SVT contains information regarding the actual disk location of where the 8 MB data resides. As described above with regard to FIG. 6B, entries in the CVT associated with locally-owned logical blocks can include a segment identifier in their Node Number/SVT Pointer field. Accordingly, this provides mapping (e.g., via the SVT) to physical storage owned by the storage node. Referring again to FIG. 8A, a segment in the SVT also includes eight SVT entries (shown by dotted box 802), each SVT entry mapping to a 1 MB region of physical storage. FIG. 8B is a diagram illustrating an example SVT entry. Each SVT entry has a 2 byte bit map 804 to track which of the 64 KB chunks has been written to within the 1 MB. Each SVT entry also has a sequence number (e.g., Seq Num: 11) to track a snapshot to which the 1 MB data belongs. The 1 MB regions belonging to all the snapshots are maintained as a list.

Figure 9:
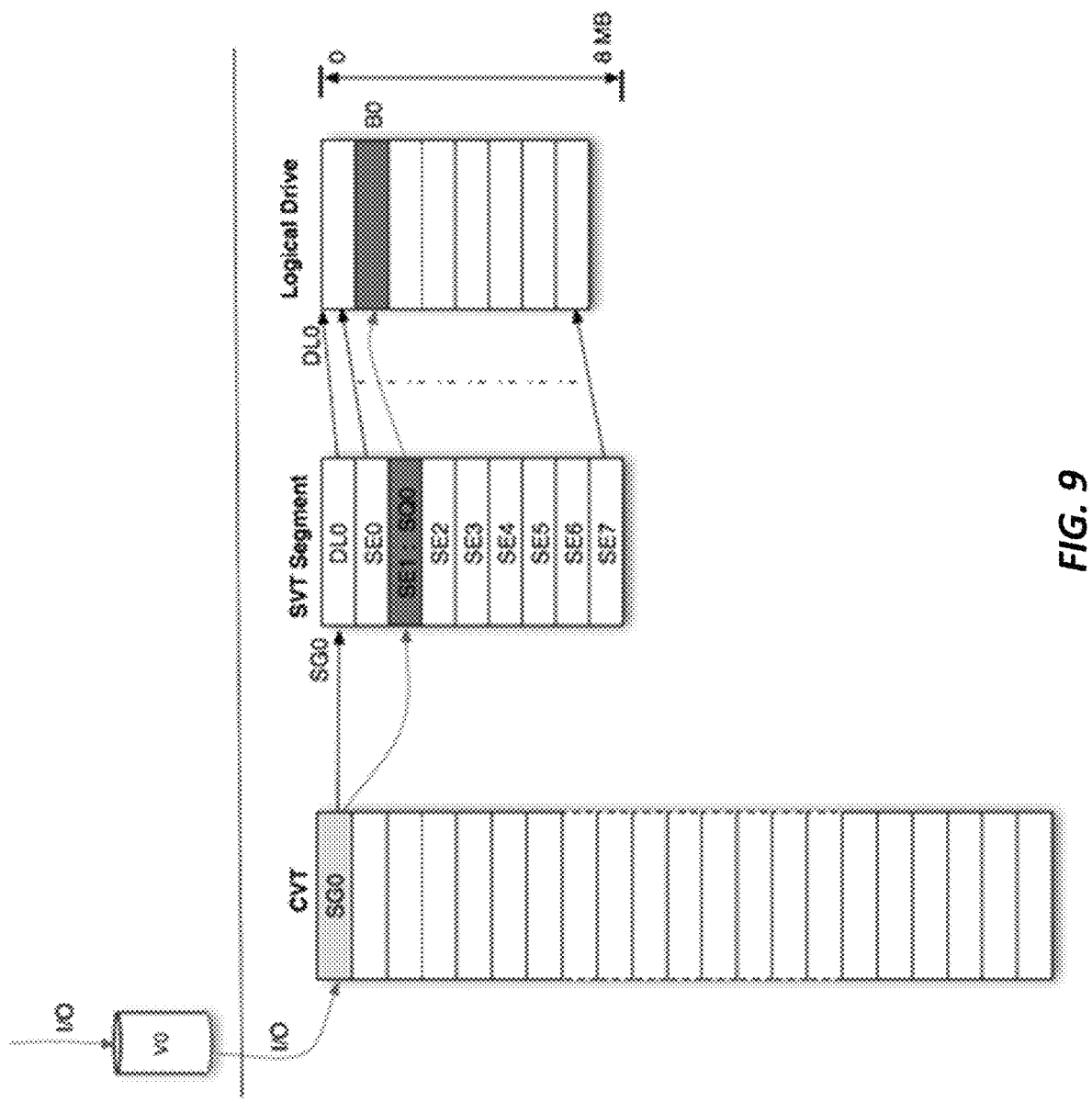
FIG. 9 is a diagram illustrating usage of an example CVT and an example SVT during I/O operations.

Referring now to FIG. 9, a diagram illustrating usage of an example CVT and an example SVT during I/O operations is shown. With the CVT created, the global volume is ready for I/O operations. When an I/O operation is received by a storage node, the CVT can be referenced to determine whether it is directed to a logical block (e.g., 8 MB logical block) owned by the storage node. If it is not, then the I/O operation is redirected to the owner storage node. On the other hand, if the I/O operation is directed to a logical block (e.g., 8 MB logical block) owned by the storage node, the SVT can be referenced to access a location in the physical storage owned by the storage node. In the event that the logical block has not been allocated, the DVM module of the storage node can allocate an 8 MB area locally and then store the allocated area's segment identifier of a segment of the SVT in the CVT (e.g., the CVT stored in memory). Accordingly, the CVT can include the information of which storage node owns each 8 MB block. Additionally, for the 8 MB blocks owned by the storage node, the CVT can include the segment identifier of a segment of the SVT (e.g., SG0 as shown in FIG. 9) of where the data resides locally. Segment SG0 of the SVT can be used to access the physical storage where the data resides locally.

Figure 10:
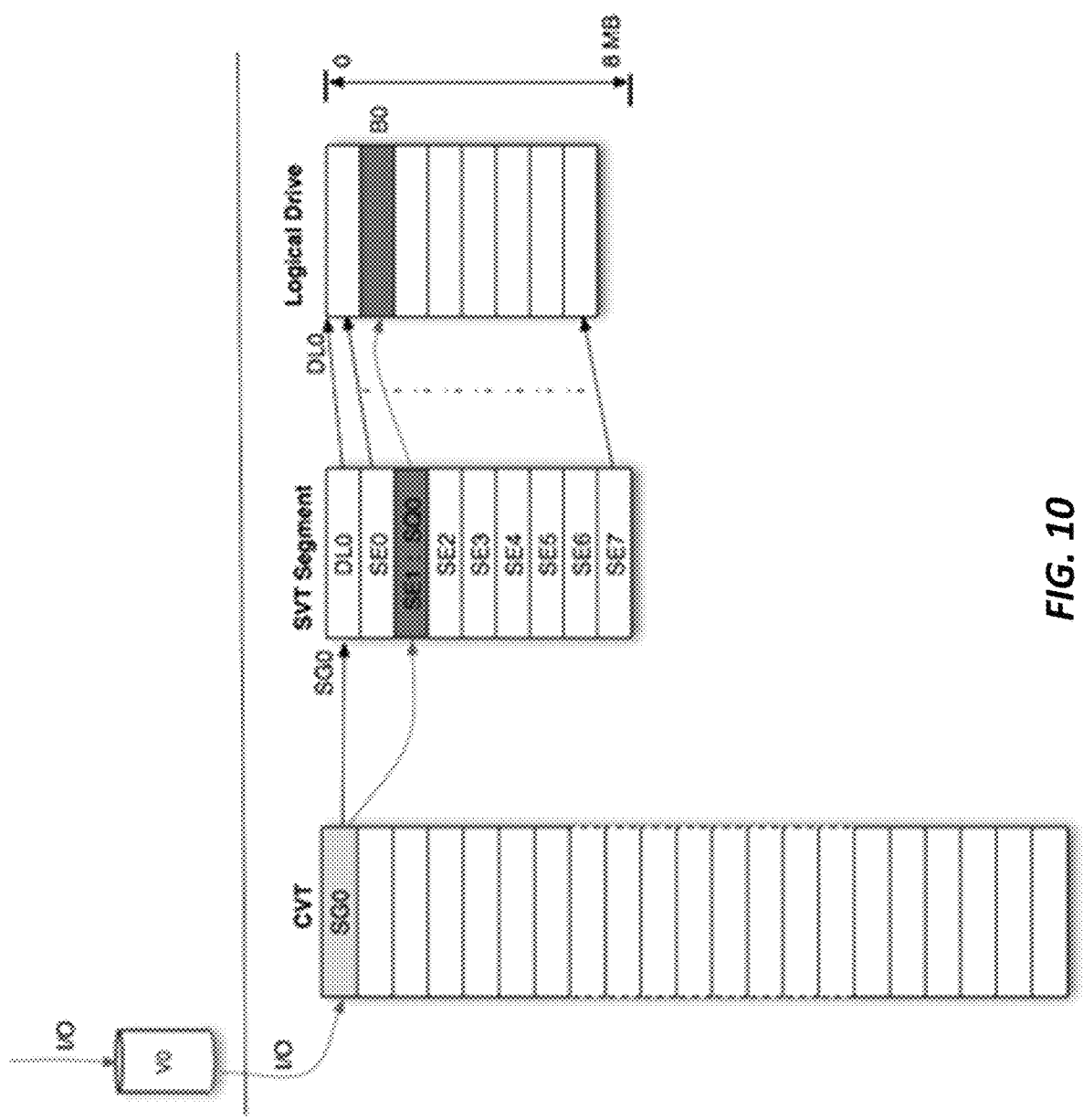
FIG. 10 is a diagram illustrating usage of an example CVT and an example SVT before a snapshot capture.

Referring now to FIG. 10, a diagram illustrating usage of an example CVT and an example SVT before a snapshot capture is shown. FIG. 10 shows how the SVT is used for local data residency, as well as providing snapshots for those data blocks. For example, a write to block B0, which is owned locally, has allocated an 8 MB block locally. This is tracked with the SVT segment SG0 as shown in FIG. 10. Segment SG0 holds the actual disk location DL0 of the 8 MB block. Additionally, the CVT stores the segment identifier SG0, for example, in its Node Number/SVT Pointer field (e.g., as shown in FIG. 6B). It should be understood that the CVT stored in memory includes the segment identifier SG0, while the CVT flushed to the disk only stores the Node Number. Segment SG0 in turn has eight SVT entries, each accounting for 1 MB. In FIG. 10, the write has been to the second 1 MB region, and this has resulted in the second SVT entry SE1 being used. The SVT entry SE1 is tagged with the sequence number SQ0 to indicate that the data belongs to the volume when the volume was in a sequence SQ0 (SG0:SE1: SQ0).

Figure 11:
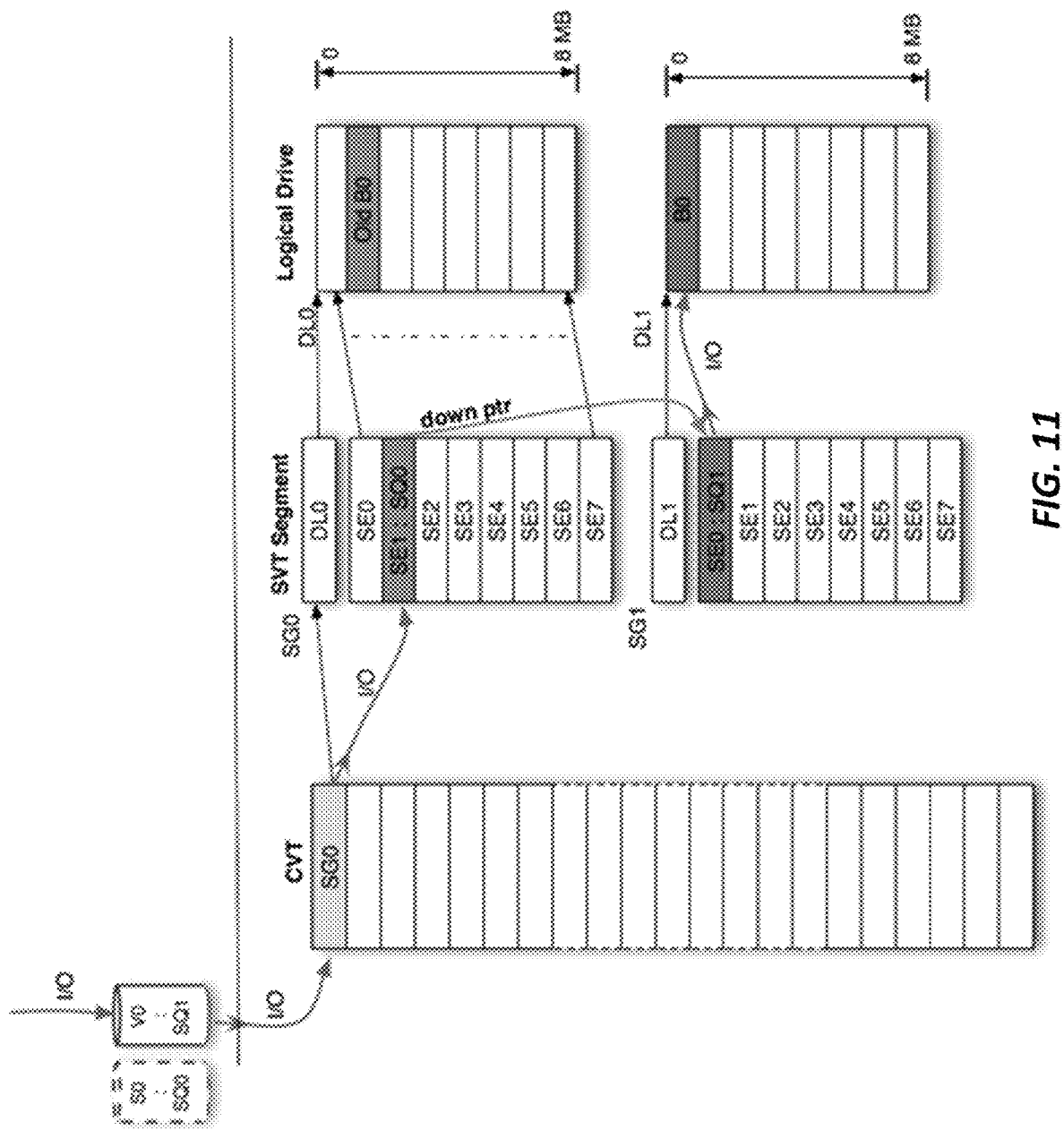
FIG. 11 is a diagram illustrating usage of an example CVT and an example SVT after the snapshot capture.

Referring now to FIG. 11, a diagram illustrating usage of an example CVT and an example SVT after the snapshot capture is shown. A snapshot at this time moves the volume to sequence number SQ1. And, a write I/O operation to the volume at Block B0 after snapshot capture results in allocation of another SVT segment SG1, and another SVT entry SEC) within the segment SG1. This entry will be tagged with sequent number SQ1, and added to the list (SG1:SE0:SQ1). Another snapshot taken at this point of time would move the volume sequence number to SQ2. And, a write I/O operation to the volume again at block B0 would result in the usage of SVT segment SG1, another entry SE1 within the segment SG1, and the down pointer of SG1:SE0:SQ1 updated to point to SG1:SE1:SQ2.

Figure 12:
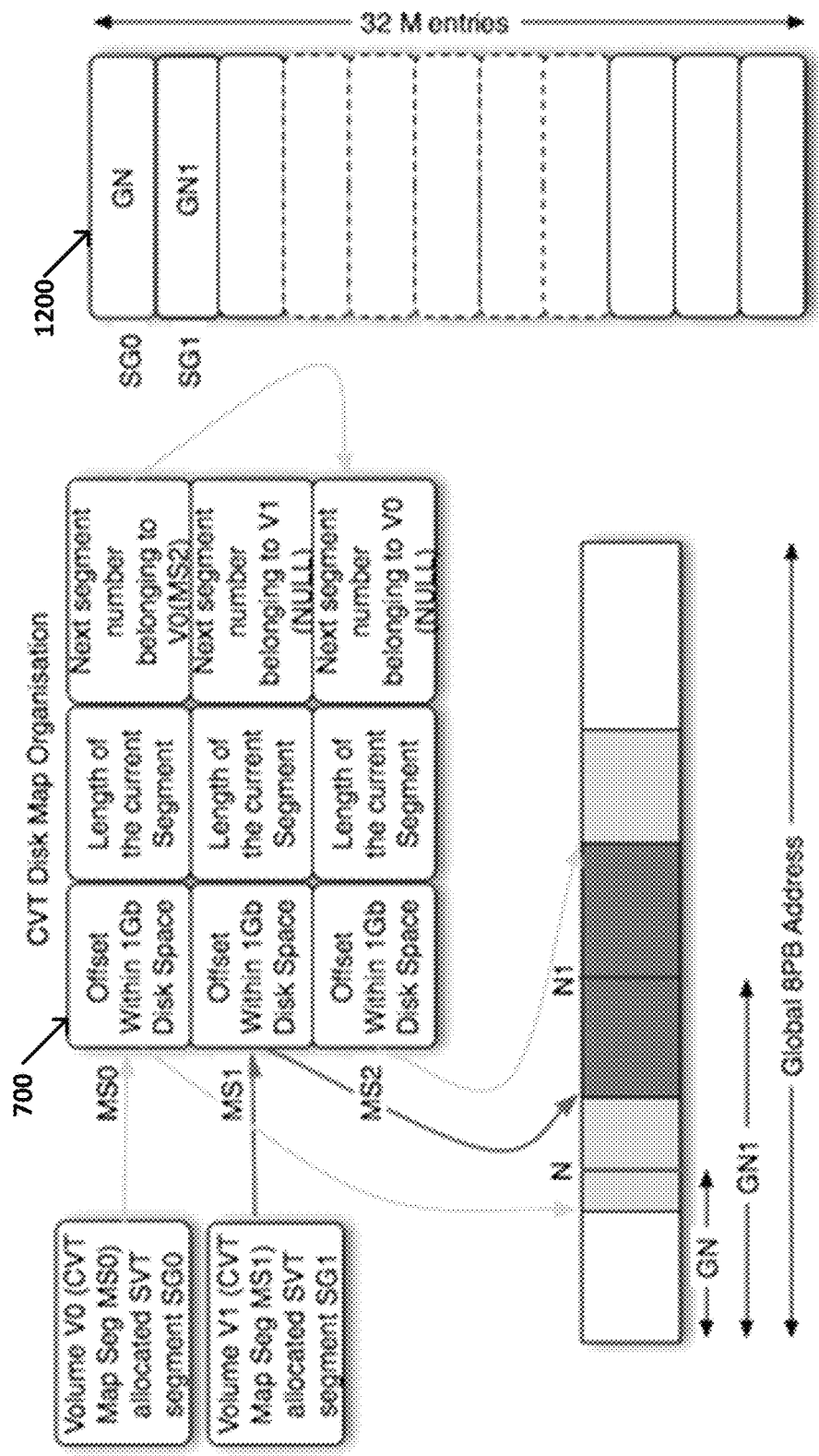
FIG. 12 is a diagram illustrating an example reverse SVT.

Referring now to FIG. 12, a diagram illustrating an example reverse SVT 1200 is shown. FIG. 12 also illustrates the CVT disk storage and the CVT disk map 700 as described in FIG. 7. The SVT is persisted to the disk during storage node shutdown as it contains data placement information pertaining to the local storage node alone. The CVT stored in memory, on the other hand, contains both the data placement information pertaining to all of the storage nodes (i.e., both local and remote storage nodes), as well as the data placement information pertaining to the local storage node. In particular, as described herein, the CVT stored in memory contains the segment identifiers of segments of the SVT that pertain to locally owned logical blocks in its entries. Thus, entries in the CVT are place holders each with the size of a segment identifier of a segment of the SVT (e.g., 25 bits in length), and an entry in the CVT either stores information identifying an owner storage node (e.g., the Node Number with an 8 bit length) or a segment identifier of the SVT (e.g., the segment identifier for the locally owned 8 MB logical block with a 25 bit length).

To remove the redundant place holders before persisting the CVT to disk during storage node shutdown, the information stored by the in-memory CVT can be divided into two parts. The first part is the CVT stored in the disk as described above with regard to FIG. 6A with entries storing only Node Numbers (e.g., 8-bit arrays) for both the locally-owned and remotely-owned logical blocks. The second part is another table, which is referred to herein as the reverse SVT 1200. The reverse SVT includes a plurality of entries, where each of the entries can include information associating a respective segment of the SVT with a respective entry in the CVT. As shown in FIG. 12, the information associating the respective segment of the SVT with the respective entry in the CVT can include an address (e.g., the global offset address GN, GN1, etc.) of the respective entry in the CVT within the global CVT address space (i.e., within the contiguous portion of the disk reserved for CVT storage). As described above with regard to FIG. 7, a contiguous portion of the disk (e.g., 1 GB) can be reserved for storing the respective CVTs for all of the volumes. The CVT disk map 700 can be used to manage the on-disk location information of the respective CVTs for each of the volumes. In other words, instead of persisting to segment identifiers of segments of the SVT that are stored in entries of the CVT (e.g., which require 25 bits), the reverse SVT is persisted to disk. The reverse SVT includes information as to which entry in the CVT each segment identifier belongs to (e.g., which require only 8 bits). In this way, the metadata table size requirement is reduced, as the number of entries in the SVT depends on the local storage node size, and not on the global volume size.

Each entry in the reverse SVT can be 4 bytes, which store information as to which entry in the CVT it belongs. The reverse SVT 1200 can have a footprint of 128 MB, which is provided only as an example. This disclosure contemplates that the reverse SVT can be more or less than 128 MB. The entry in the CVT corresponds to the entire volume addressability (e.g., the 8 PB addressable volume space described above with regard to FIGS. 6A and 6B). The entire 8 PB volume addressability can be distributed across multiple volumes. It should be understood, however, that I/O operations are directed to a particular logical block address (LBA) within a particular volume. For all first time local space allocations for a particular volume, a segment identifier of a segment of an SVT is reserved and given to the particular volume. A reverse SVT field can be provided for each segment identifier, and this field can store information of which particular volume and LBA within the particular volume for which the segment of the SVT has been reserved. Using the global CVT address space, the particular volume and LBA within the particular volume can be obtained as a single address (as opposed to using two separate fields). In other words, the global CVT address space facilitates the ability to obtain a unique identifier for each volume, LBA pair. Additionally, this information is present in the CVT disk map 700 described with regard to FIG. 7.

Figure 13:
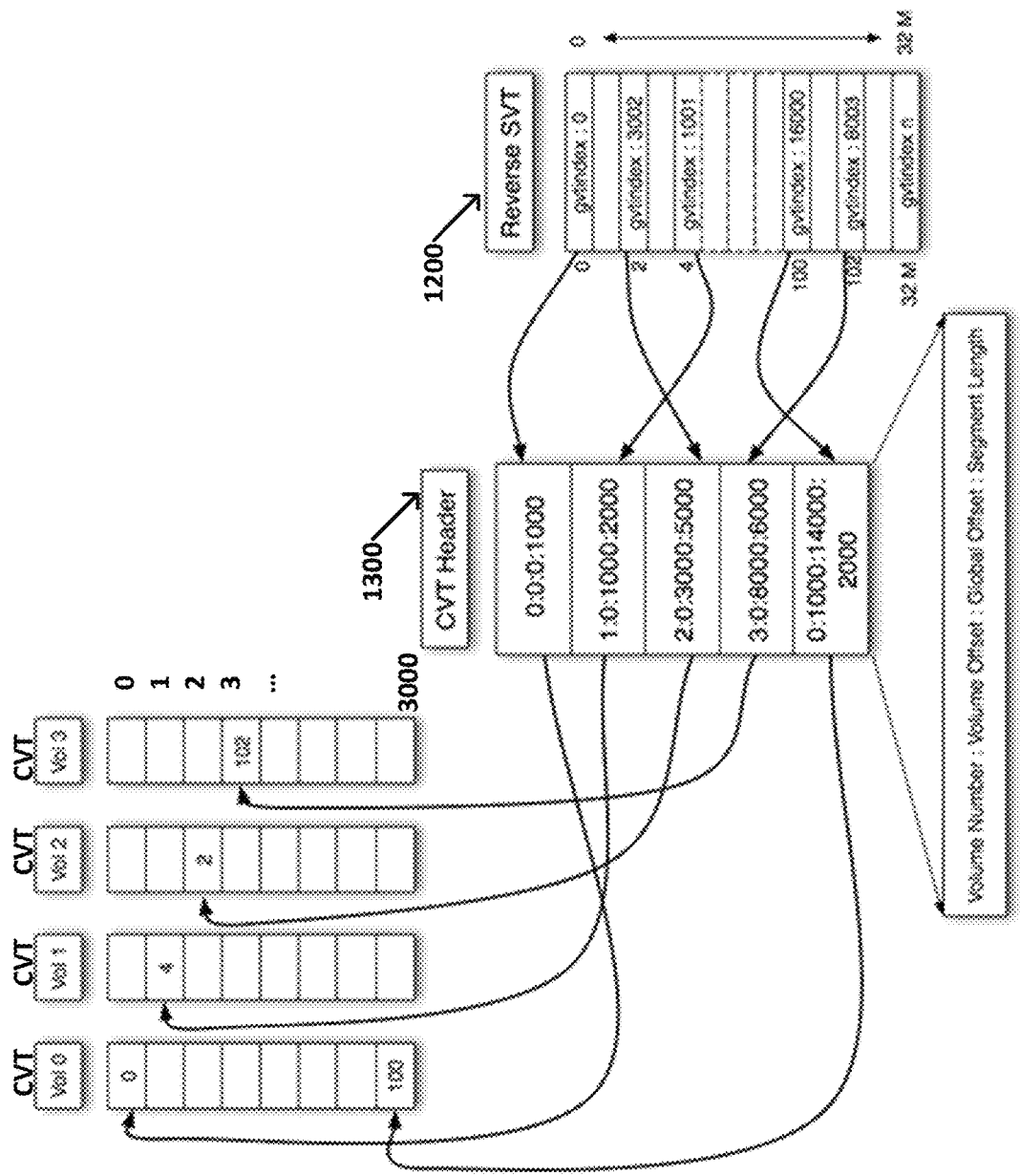
FIG. 13 is a diagram illustrating regeneration of the CVT in memory.

Referring now to FIG. 13, a diagram illustrating regeneration of the CVT in memory is shown. As described above, during storage node shutdown, the SVT can be persisted to the disk, while not persisting to disk the data placement information pertaining to the local storage node contained the in-memory CVT. Instead, only data placement information pertaining to all of the storage nodes (e.g., only the Node Numbers) contained in the CVT can be persisted to the disk. For the purpose of regenerating the CVT in memory, the reverse SVT 1200 can be persisted to the disk during storage node shutdown. During system startup (e.g., during a power-on operation), the reverse SVT 1200, the CVT (containing only the Node Number information), and information from the CVT disk map can be read from disk to regenerate the in-memory CVT including the data placement information pertaining to the local storage node.

For example, a CVT header 1300 including a plurality of entries can be generated. Each of the entries in the CVT header 1300 can include a volume field, a volume offset field, a global offset field, and a length field. Each of the entries in the CVT header 1300 can be 12 bytes, which is provided only as an example. This disclosure contemplates that each of the entries can be more or less than 12 bytes. With 128 k entries, the CVT header 1300 has a footprint of about 1.5 MB (e.g., 12 bytes×128 k entries). The volume field can store a volume number to which the portion of the global CVT address space belongs to, the volume offset field can store the offset within the volume, the global offset field can store the offset within the global CVT address space, and the length field can store a length of the continuous segment. The CVT header 1300 can be generated using the CVT disk map described with regard to FIG. 7. The CVT header 1300 can be generated as a sorted array, such that each subsequent entry has an increasing addressability in the global CVT address space. For example, as shown in FIG. 13, the global offset of each subsequent entry in the CVT header 1300 is a sum of the global offsets/segment lengths of all previous entries in the CVT header 1300. For example, the second entry in the CVT header 1300 (i.e., 1:0:1000:2000) has a global offset of 1000, which is the sum of the global offset and segment length of the first entry in the CVT header 1300, i.e., 0 and 1000, respectively. The third entry in the CVT header 1300 (i.e., 2:0:3000:5000) has a global offset of 3000, which is the sum of the global offset and segment length of the second entry in the CVT header 1300, i.e., 1000 and 2000, respectively. The reverse SVT 1200 can be used to fill in the segment identifiers of the segments of the SVT. As described above, the entries in the reverse SVT 1200 contain information about the particular volume, LBA combination as addresses (e.g., the global offset address GN, GN1, etc.) of the respective entries in the CVT within the global CVT address space. As shown in FIG. 13, entries 0, 2, 4, 100, and 102 in the reverse SVT 1200 include gvtindexes of 0, 3002, 1001, 16000, and 8003, respectively. The gvtindexes are addresses of respective entries in the CVTs within the global CVT address space. Entry 0 in the reverse SVT 1200 indicates that segment SG0 is associated with entry 0 in Volume 0's CVT (i.e., gtvindex–global offset+ volume offset=0−0+0=0). Entry 2 in the reverse SVT 1200 indicates that segment SG2 is associated with entry 2 in Volume 2's CVT (i.e., gtvindex–global offset+volume offset=3002−3000+0=2). Entry 4 in the reverse SVT 1200 indicates that segment SG4 is associated with entry 1 in Volume 1's CVT (i.e., gtvindex–global offset+volume offset=1001−1000+0=1). Entry 100 in the reverse SVT 1200 indicates that segment SG100 is associated with entry 3000 in Volume 0's CVT (i.e., gtvindex–global offset+volume offset=16000−14000+1000=3000). Entry 102 in the reverse SVT 1200 indicates that segment SG102 is associated with entry 3 in Volume 3's CVT (i.e., gtvindex–global offset+ volume offset=8003−8000+0=3).

It should be appreciated that the logical operations described herein with respect to the various figures may be implemented (1) as a sequence of computer implemented acts or program modules (i.e., software) running on a computing device (e.g., the storage server computer described in FIG. 2), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 14A:
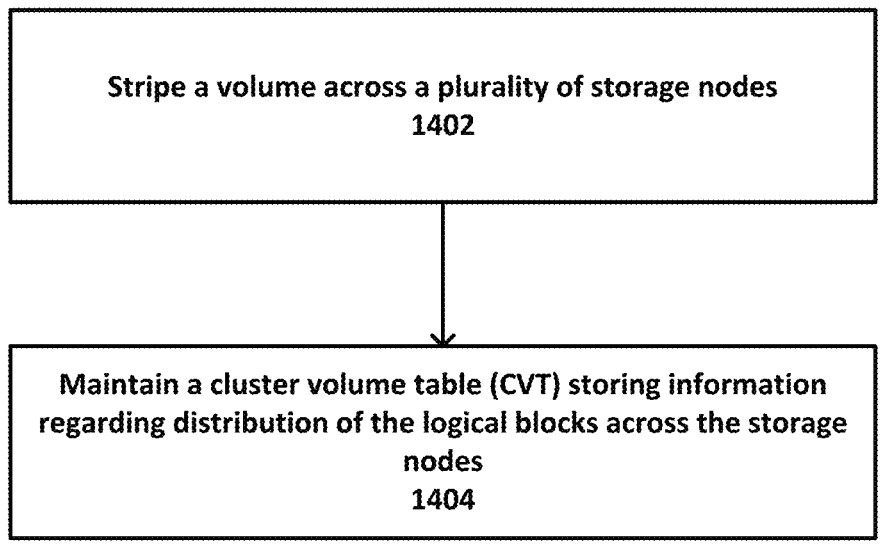
FIG. 14A is a diagram illustrating example operations for intelligent distribution of data in a storage cluster according to implementations described herein.

Referring now to FIG. 14A, a diagram illustrating example operations for intelligent distribution of data in a storage cluster is shown. At 1402, a volume can be striped across a plurality of storage nodes. A plurality of logical blocks of the volume can be distributed to the storage nodes in relation to respective sizes of the storage nodes, for example, using a factor as described with regard to FIG. 5. At 1404, a cluster volume table (CVT) storing information regarding distribution of the logical blocks across the storage nodes can be maintained. The CVT can include a plurality of entries, where each of the entries in the CVT can include information identifying a respective owner storage node of a respective logical block. An example CVT is described above with regard to FIG. 3. In some cases, the CVT can be stored in memory and includes data placement information pertaining to the local storage node (e.g., segment identifiers for segments of the SVT). In other cases, the CVT can be persisted to a disk and include only data placement information pertaining to all of the storage nodes (e.g., only the Node Numbers).

Figure 14B:
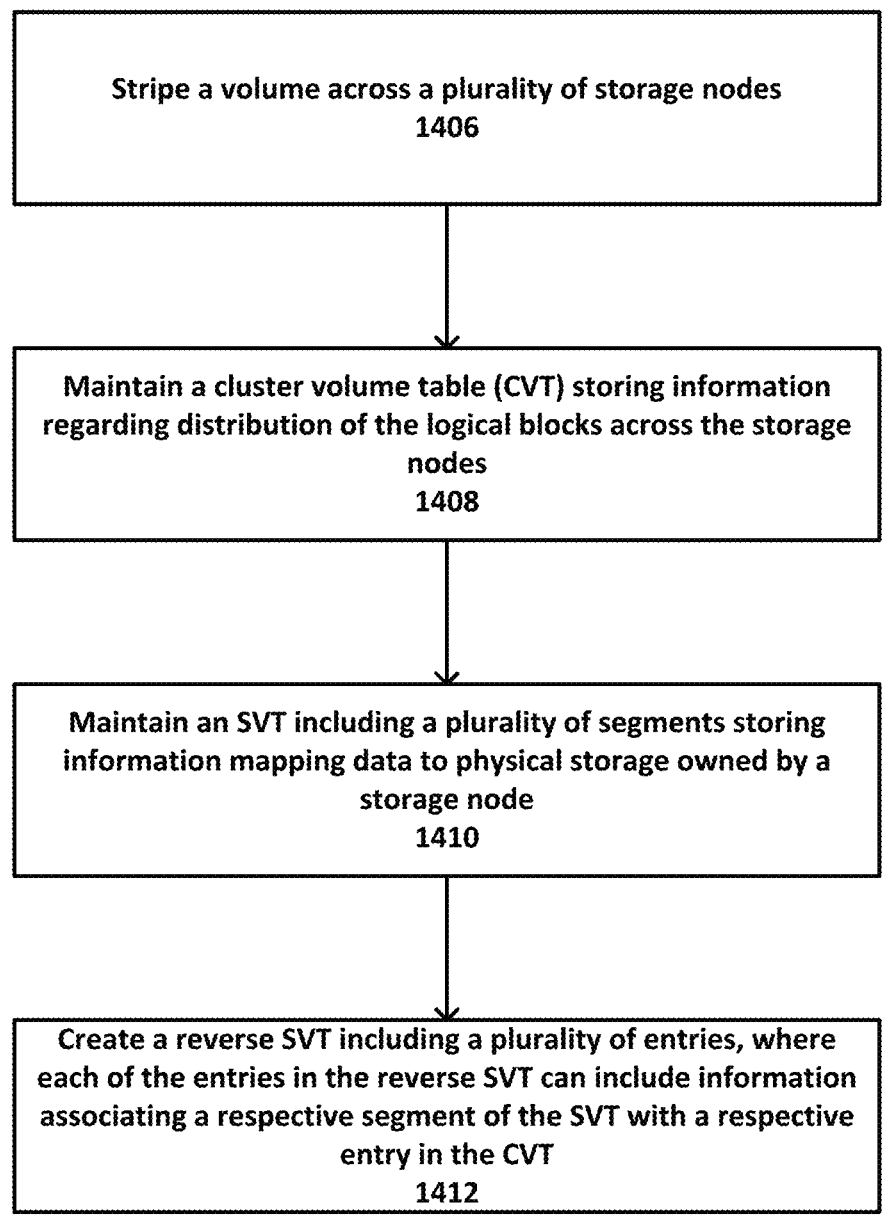
FIG. 14B is another diagram illustrating example operations for intelligent distribution of data in a storage cluster according to implementations described herein.

Referring now to FIG. 14B, another diagram illustrating example operations for intelligent distribution of data in a storage cluster is shown. At 1406, a volume can be striped across a plurality of storage nodes. Optionally, a factor can be used to determine a number of logical blocks distributed to a storage node for each stripe when striping the volume across the storage nodes. A plurality of logical blocks of the volume can be distributed to the storage nodes. At 1408, a cluster volume table (CVT) storing information regarding distribution of the logical blocks across the storage nodes can be maintained. The CVT can include a plurality of entries, where each of the entries in the CVT can include information identifying a respective owner storage node of a respective logical block. An example CVT is described above with regard to FIG. 3. In some cases, the CVT can be stored in memory and includes data placement information pertaining to the local storage node (e.g., segment identifiers for segments of the SVT). In other cases, the CVT can be persisted to a disk and include only data placement information pertaining to all of the storage nodes (e.g., only the Node Numbers). At 1410, an SVT including a plurality of segments storing information mapping data to physical storage owned by a storage node can be maintained. An example SVT is described above with regard to FIGS. 8A and 8B. At 1412, a reverse SVT including a plurality of entries can be created. Each of the entries in the reverse SVT can include information associating a respective segment of the SVT with a respective entry in the CVT. For example, as described above, each of the entries in the reverse SVT can include an address of a respective entry in a CVT within the global CVT address space reserved for storage of the CVTs. An example reverse SVT is described above with regard to FIG. 12. Optionally, an in-memory CVT, which includes data placement information pertaining to the local storage node (e.g., segment identifiers for segments of the SVT), can be regenerated, for example, based at least in part on the CVT and reverse SVT persisted to the disk during storage node shutdown.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for intelligent distribution of data in a storage cluster, comprising:

striping a volume across a plurality of storage nodes, wherein a plurality of logical blocks of the volume are distributed to the storage nodes in relation to respective sizes of the storage nodes;

maintaining a cluster volume table (CVT) storing information regarding distribution of the logical blocks across the storage nodes, wherein the CVT comprises a plurality of entries, wherein each of the entries in the CVT comprises information identifying a respective owner storage node of a respective logical block, and wherein the CVT is stored in memory of a storage node;

maintaining a system volume table (SVT) comprising a plurality of segments storing information mapping data to physical storage owned by the storage node, wherein an entry in the CVT that includes information identifying the storage node as an owner of a logical block further comprises a segment identifier of a segment of the SVT; and creating a reverse SVT comprising a plurality of entries, wherein each of the entries in the reverse SVT comprises information associating a respective segment of the SVT with a respective entry in the CVT.

2. The computer-implemented method of claim 1, wherein striping the volume across the storage nodes further comprises using a factor to determine a number of logical blocks distributed to a storage node for each stripe.

3. The computer-implemented method of claim 1, further comprising generating the CVT in memory using an on-disk CVT, a CVT disk map, and the reverse SVT.

4. The computer-implemented method of claim 3, wherein the CVT stored in memory is generated during a power-on operation.

5. The computer-implemented method of claim 4, wherein the CVT stored in memory has a larger footprint than the on-disk CVT.

6. The computer-implemented method of claim 1, further comprising:
- receiving an input/output (I/O) operation at the storage node;
- determining, using the CVT, whether the I/O operation is directed to a logical block owned by the storage node; and
- if the I/O operation is directed to the logical block owned by the storage node, accessing, using the SVT, a location in the physical storage owned by the storage node.

7. The computer-implemented method of claim 1, wherein the CVT is stored in a disk.

8. The computer-implemented method of claim 7, wherein the CVT is stored in a contiguous portion of the disk that stores respective CVTs for a plurality of volumes.

9. The computer-implemented method of claim 8, wherein the CVT comprises a plurality of fragmented segments in the contiguous portion of the disk.

10. The computer-implemented method of claim 8, wherein the CVT comprises a continuous segment in the contiguous portion of the disk.

11. The computer-implemented method of claim 8, further comprising maintaining a CVT disk map comprising a plurality of entries, wherein each of the entries in the CVT disk map comprises a global offset field, a length field, and a next segment field.

12. A non-transitory computer-readable recording medium having computer-executable instructions stored thereon for intelligent distribution of data in a storage cluster that, when executed by a storage system computer, cause the storage system computer to:
- stripe a volume across a plurality of storage nodes, wherein a plurality of logical blocks of the volume are distributed to the storage nodes in relation to respective sizes of the storage nodes;
- maintain a cluster volume table (CVT) storing information regarding distribution of the logical blocks across the storage nodes, wherein the CVT comprises a plurality of entries, and wherein each of the entries in the CVT comprises information identifying a respective owner storage node of a respective logical block, and wherein the CVT is stored in memory of a storage node;
- maintain a system volume table (SVT) comprising a plurality of segments storing information mapping data to physical storage owned by the storage node, wherein an entry in the CVT that includes information identifying the storage node as an owner of a logical block further comprises a segment identifier of a segment of the SVT; and
- create a reverse SVT comprising a plurality of entries, wherein each of the entries in the reverse SVT comprises information associating a respective segment of the SVT with a respective entry in the CVT.

13. A computer-implemented method for intelligent distribution of data in a storage cluster, comprising:
- striping a volume across a plurality of storage nodes, wherein a plurality of logical blocks of the volume are distributed to the storage nodes;
- maintaining a cluster volume table (CVT) storing information regarding distribution of the logical blocks across the storage nodes, wherein the CVT comprises a plurality of entries, and wherein each of the entries in the CVT comprises information identifying a respective owner storage node of a respective logical block;
- maintaining a system volume table (SVT) comprising a plurality of segments storing information mapping data to physical storage owned by a storage node; and
- creating a reverse SVT comprising a plurality of entries, wherein each of the entries in the reverse SVT comprises information associating a respective segment of the SVT with a respective entry in the CVT.

14. The computer-implemented method of claim 13, wherein the CVT, the SVT, and the reverse SVT are stored in a disk.

15. The computer-implemented method of claim 14, wherein the CVT is stored in a contiguous portion of the disk that stores respective CVTs for a plurality of volumes.

16. The computer-implemented method of claim 15, wherein the information associating the respective segment of the SVT with the respective entry in the CVT comprises an address of the respective entry in the CVT within the contiguous portion of the disk.

17. The computer-implemented method of claim 16, further comprising creating a CVT header comprising a plurality of entries, wherein each of the entries in the CVT header comprises a volume field, a volume offset field, a global offset field, and a length field.

18. The computer-implemented method of claim 17, further comprising generating an in-memory CVT, wherein the in-memory CVT is generated in memory using the CVT, the CVT header, and the reverse SVT.

19. The computer-implemented method of claim 18, wherein the in-memory CVT is generated during a power-on operation.

20. The computer-implemented method of claim 18, wherein an entry in the in-memory CVT that includes information identifying the storage node as an owner of a logical block further comprises a segment identifier of a segment of the SVT.

21. The computer-implemented method of claim 20, wherein the in-memory CVT has a larger footprint than the CVT stored in the disk.

* * * * *